July 17, 1956

A. PAGNI 2,754,782

SEWING MACHINE SUITABLE BOTH FOR MOTOR AND HAND DRIVE

Filed Feb. 25, 1952

INVENTOR.
A. Pagni
BY
Wenderoth, Lind & Ponack
Attorneys

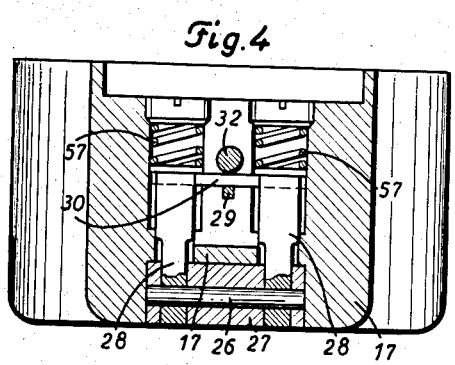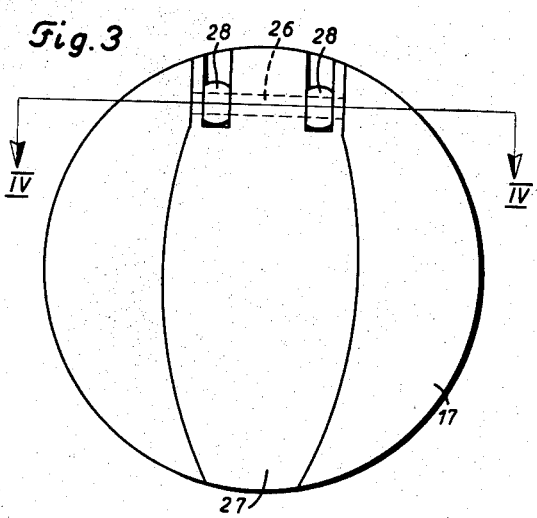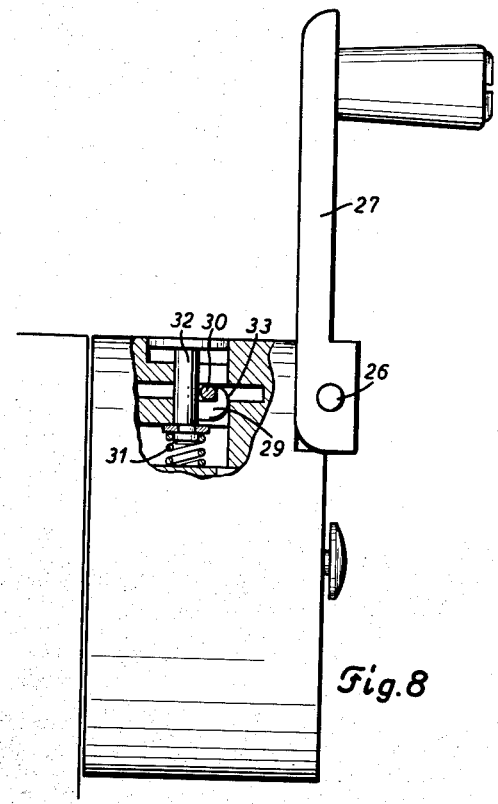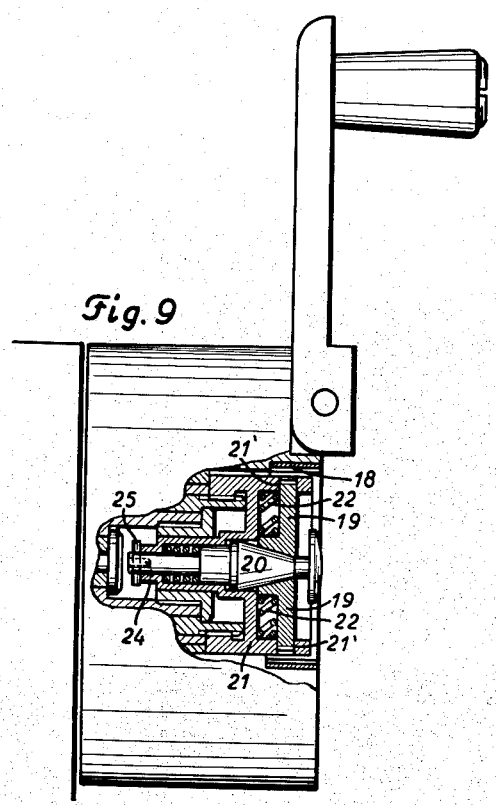

INVENTOR.
A. Pagni
BY
Wenderoth, Lind & Ponack
Attorneys

# United States Patent Office 2,754,782
Patented July 17, 1956

2,754,782

SEWING MACHINE SUITABLE BOTH FOR MOTOR AND HAND DRIVE

Alessandro Pagni, Milan, Italy, assignor to Vittorio Necchi S. P. A., Pavia, Italy Application February 25, 1952, Serial No. 273,307

Claims priority, application Italy November 30, 1951

10 Claims. (Cl. 112—220)

Sewing machines as now constructed are provided with a hand wheel which acts also as a fly wheel for balancing the dynamic effects of the reciprocating members of the machine.

This fly wheel is generally keyed on the upper shaft of the sewing machine and is used also for hand governing the motion of the machine when starting and stopping the same in the case of motor or pedal drive.

When a machine is to be manually actuated it is provided with a crank that actuates the flywheel through change speed gears or a multiplier gear train so as to actuate the shaft of the sewing machine carrying the flywheel at the required speed.

Manually operated machines have also been constructed wherein the crank shaft was connected to a flywheel which rotated at a reduced speed and was connected to the shaft of the sewing machine through change speed gears or a multiplier gear train but with such an arrangement the balancing action of the flywheel was considerably reduced because of its low speed. This disadvantage was only partially overcome by making the flywheel heavier.

In motor driven machines the flywheel is always keyed to the shaft of the machine because a slower rotating flywheel would render the moving masses more unbalanced and the operating conditions for the electric motor would be more severe. Therefore, when electrically driven machines are provided with a crank for manual drive, such a crank can not be applied to the flywheel. The crank together with the change speed transmission or relative speed reducing gear is formed as a removable unit which may be used occasionally as an attachment when there is a failure of electrical supply or there is a motor breakdown.

An object of the present invention is to provide a sewing machine having a crank permanently connected to the flywheel for the manual control of the starting and stopping of the machine.

A further object is to provide a crank connected to the flywheel in such a way as to form with the latter a balanced rotational mass.

A further object of the invention is to provide a flywheel which carries the crank but which is not keyed to the machine shaft but is mounted for loose rotation thereon and is connected thereto by a change speed transmission whereby the rotational speed of the flywheel may be less than that of the shaft. However, with such an arrangement as mentioned above, the balancing action of the flywheel would not suffice and therefore a further object of the invention is to provide a second flywheel keyed to one of the two shafts of the sewing machine.

Therefore a further object of the invention is to provide a second flywheel upon the sewing machine rotating at a higher speed than the first flywheel carrying the crank and which develops the major part of the balancing action. The balancing action of such second flywheel is only a portion of the total balancing action. Therefore such second flywheel may be constructed of smaller dimensions that the flywheels which are normally carried by the upper shaft of motor driven sewing machines. Furthermore it may be arranged within the machine frame and may be used as a wheel or pulley for transmitting motion to the rotating parts of the machine.

With the above and other objects in view which will become apparent from the detailed description below describing a preferred embodiment which is shown in the drawings wherein:

Figure 3 is an elevational view of a detail taken from line III—III of Figure 2 looking in the direction of the arrows.

Figure 4 is a cross-sectional view taken upon section line IV—IV upon Figure 3 looking in the direction of the arrows.

Figures 5, 6, 7, 8 and 9 are elevational views with portions shown in cross-section illustrating the hand wheel in five different positions of the crank and parts connected thereto.

In the various drawings similar reference characters indicate like parts.

Figure 1:
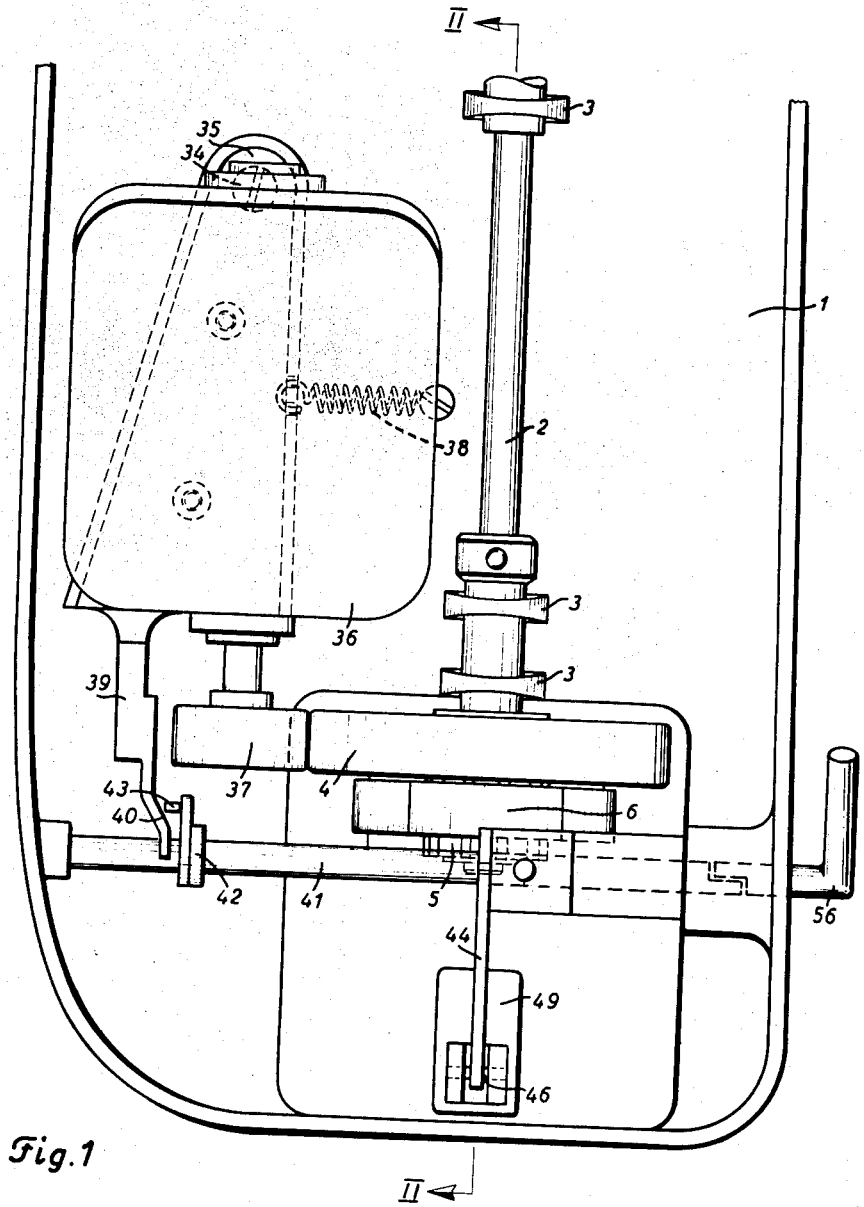
Figure 1 is a bottom plan view of a portion of a sewing machine illustrating the invention.

The frame 1 of the sewing machine carries at the bottom thereof the shaft 2 driving the lower central sewing mechanism whose details are not shown since this construction is well known. The shaft 2 is supported in the bearings 3. A flywheel 4 is keyed to the shaft 2 and is connected with a gear 5. A drive belt 6 transmits the rotation of the gear 5 to the gear 7 keyed upon the upper shaft 8 mounted in the part 9 fixed to the frame 1.

The shaft 8 carries a pinion 10 which is in mesh with a gear 11 freely supported by the pin 12 mounted in the part 9. On the pin 12 there is also keyed a pinion 13 meshing with a gear 14 which has a sleeve 15 mounted loosely upon a sleeve 16 fixed in the part 9 and projecting from the frame 1.

A flywheel 17 is freely mounted on the sleeve 15. A sleeve 21 is freely rotatable within the flywheel 17 and is fixed to the sleeve 15.

Two jaws 19 are urged by springs 22 to move toward the axis of the flywheel 17 along the holes 21' of the sleeve 21 and have terminal portions 22'. The cone 20 is urged outwardly along the axis of the flywheel by the spring 23, arranged inside the sleeve 21, until the pin 25, fixed to the rear of the cone 20 abuts the bottom of the recess 24 provided in a reduced extension of the sleeve 21. When the cone 20 is urged outwardly by the spring 23 as in Figure 2, the cone moves the two pieces 19 outwardly through the holes 21" of the sleeve 21 overcoming the action of the springs 22. The surfaces 22' engage the inner surface of the sleeve 18 fixed inside the flywheel 17. Preferably these engaging surfaces are ribbed or grooved to mate each other.

On the other hand, when the cone 20 is pressed inwardly overcoming the pressure of the spring 23 the entire distance and is rotated on its axis so that the pin 25 rests on the end of the sleeve 21, the jaws 19 urged by the springs 22 are free to move toward the axis of the flywheel.

In this way the surfaces 22' are free from the sleeve 18 and the flywheel 17 is free from the bushing 15 and from the upper shaft 8.

Figure 2:
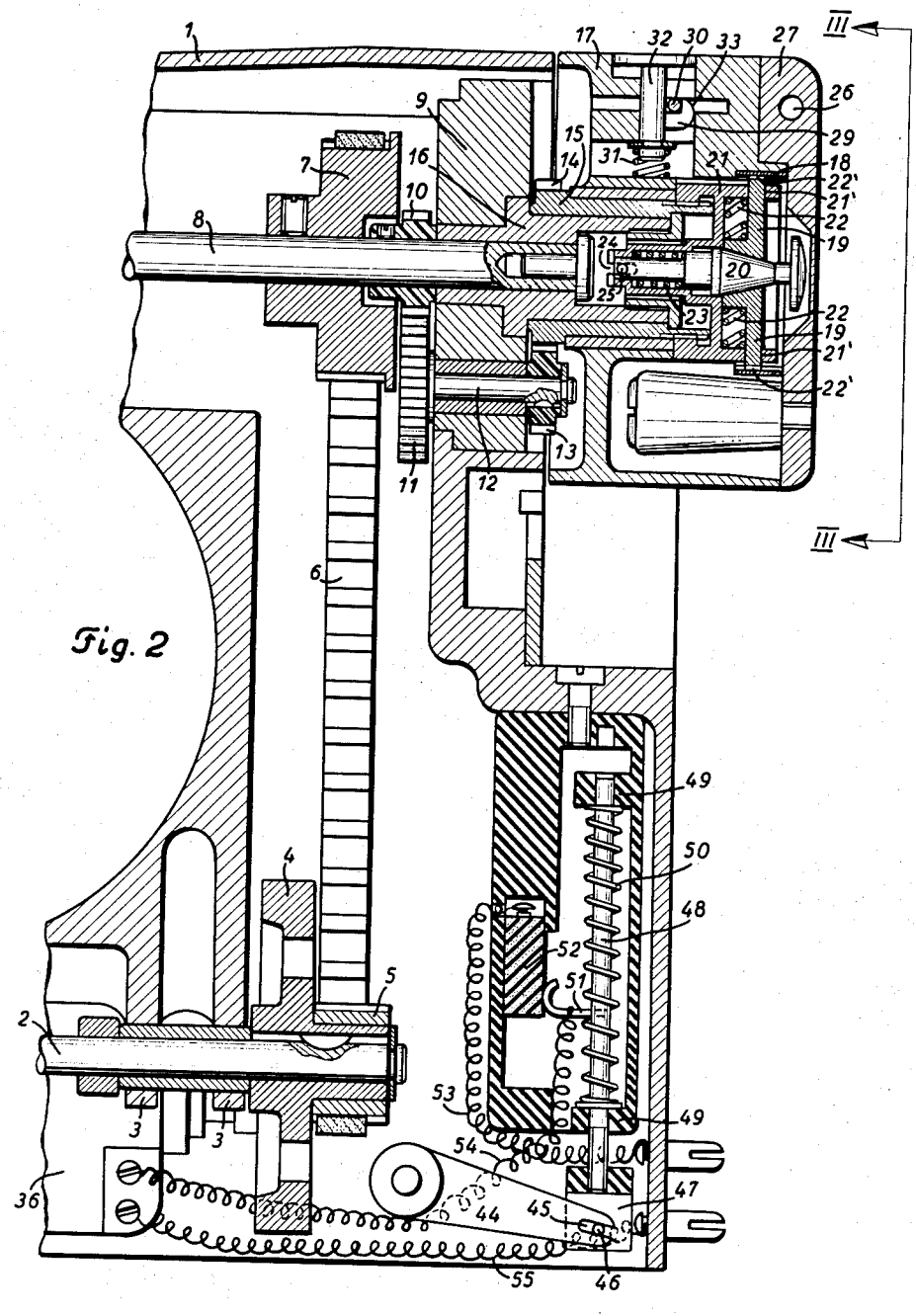
Figure 2 is a cross-sectional view taken upon section line II—II of Figure 1.

The flywheel 17 has a crank 27 pivotally mounted upon the pivot 26 and when in the position shown in Figure 2 forms with the flywheel a unitary structure whose center of gravity is on the axis of the flywheel and whose mass is dynamically balanced also with respect to such axis.

The pivot 26 is carried by two pieces 28 mounted freely in the flywheel 17 for axial movement with the interpositioning of two springs 57, see Figure 4. The unit consisting of the crank 27, the pivot 26 and the pieces 28 is held in place by a hook 29 connected to the piece 32 and engaging with its hook shaped end a pin 30 carried by the pieces 28.

The hook 29 is mounted on the flywheel 17 so that it can be lowered by overcoming the thrust of the spring 31 acting on the piece 32 which is provided with a knob accessible from the exterior. By depressing this knob the piece 32 is lowered and therewith the hook 29.

An oscillating support 35, see Figure 1, is mounted at 34 in the frame 1. An electric motor 36 is connected to the support 35 and the shaft thereof carries a pulley of elastic material 37 adapted to come into contact with the flywheel 4 under the action of a spring 38 connected at one end to the support 35 and at the other end to the frame 1. The support 35 is provided with an extension 39 whose end 40 is bent as shown in Figure 1.

Also rotatably mounted in the frame 1 is a cylinder 41 whose rotation is controlled by the lever of the knee control 56 when operated by the operator. The spindle 41 has fixed thereto a short arm 42 carrying a pin 43 which slides on the end 40 when the spindle 41 rotates. The spindle 41 also has fixed thereon a lever 44 provided at its end with a slot 45, see Figure 2, engaging a pin 46 carried by the forked end 47 of a rod 48. The rod 48 can slide vertically in two supports 49 mounted upon the frame 1 and a spring 50 urges the rod 48 downwardly. The rod 48 carries an electrically insulated contact 51 which slides along a rheostat 52 when the rod 48 is moved by a rotation of the spindle 41.

Two electrical conductors 53 and 55 supplied from any main line are connected as shown in Figure 2. The conductor 53 is connected to the upper end of the rheostat 52 and the conductor 55 is connected to a terminal of the motor 36. A conductor 54 connects the movable contact 51 with the other terminal of the motor 36.

The control for the electric drive of the machine is insured by the lever 56 connected angularly to the spindle 41 by means of a coupling and is actuated by the operator in the usual way. The lever 56 is maintained normally at the left of the operator by the spring 50. When lever 56 is operated to rotate the spindle 41 a short arm 42 is moved so that its pin 43 describes an arc of a circle on the inclined surface of the end 40 which is maintained in contact with the pin 43 by the action of the spring 38.

The sliding motion of the pin 43 with respect to the end 40 disengages the pin therefrom. When free from the pin 43 the end 40 under the action of the spring 38 may move forwardly sufficiently so as to bring about a frictional engagement of the pulley 37 with the flywheel 4. The lever 56 has accomplished a slight rotation, say of 5° towards the right. Continuing the rotation of the lever 56 to the right which also rotates the spindle 41 there is first obtained a closure of the electrical circuit and thereafter an operation of the rheostat from its position of rest to its position for maximum speed through the movement of the lever 44 which upon rotating controls the movement of the bar 48 and thereby controls the position of the contact 51 with respect to the rheostat 52. The bar 48 controls both the opening and closing of the electrical circuit and the operation of the rheostat.

The movement of the lever 56 for connecting and then controlling the rheostat constitutes a rotation from about 5° to about 20° which latter position corresponds to approximately the maximum elongation of the lever to the right.

Inversely the lever 56 controls the speed from a maximum to a minimum when moving to the left under the action of the spring 50 and then after completing the rheostat control, disconnects the electrical circuit. Successively, always under the action of the spring 50, the lever 56 will rotate through the remaining 5° disconnecting the electric motor from the flywheel by an operation of the above-described members in an inverse direction.

Consequently, when the machine is in the position of rest with the electrical motor disengaged it is also disengaged mechanically from the transmission.

Figure 5:
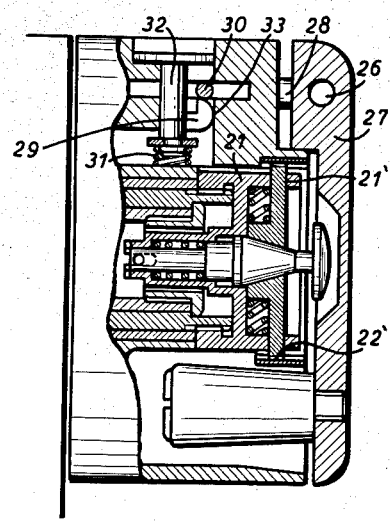
Figure 7:
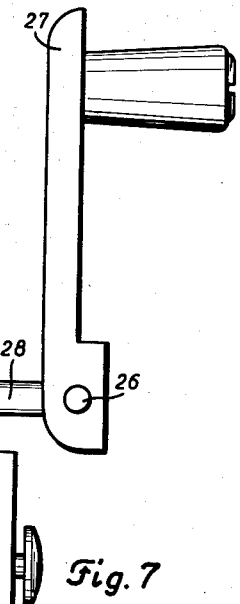
Figure 6:
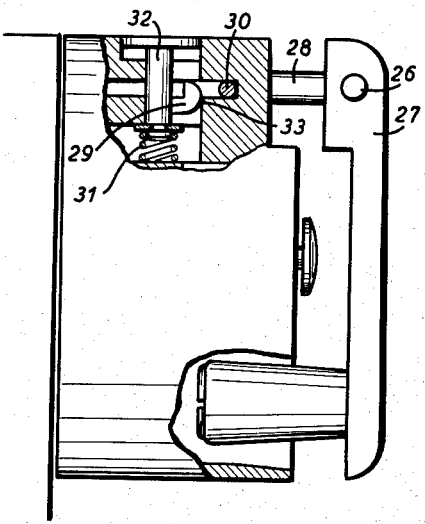

In order to operate the machine manually the first operation to be accomplished is to extract the crank 27 from its seat in the flywheel 17. This operation is carried out by hand by exerting a pressure on the knob of the piece 32 against the action of the spring 31 so as to push the piece 32 into the position shown in Figure 5. This disengages the hook 29 from the pin 30 and the action of the springs 57, see Figure 4, expels the crank from its position within the flywheel so as to bring it into the position shown in Figure 6. When in this position, the crank may be rotated through 180° about the pin 26 into the position shown in Figure 7 and it is then possible to move it manually against the action of the two springs 57 into the position shown in Figure 8.

The pin 30 acting upon the curved profile 33 of the hook 29 causes the piece 32 to descend and then upon further movement of the pin 30 the hook rises under the action of the spring 31 and engages the pin 30 to maintain the crank 27 in the position shown in Figure 8.

The machine is now ready to be manually driven by the crank 27.

In order to actuate the reeling device or in any case to disengage the handwheel 27 from the upper shaft of the machine, it is sufficient to press on knob 20 overcoming the action of the spring 23 so as to bring said knob to the end of its stroke and turn it on its own axis. From this position (shown in Figure 9) it is no longer possible for the knob to return to its initial position corresponding to the maximum extension of the spring 23 and this on account of the action of the pin 25 which, once out of the slot 24 and diverted, abuts the outer side of the ending part of piece 21.

With movements corresponding to those above illustrated and inversely actuated, the knob 20 is reinserted, thus connecting the shaft and the flywheel together.

For placing the crank 27 in position of rest in the flywheel 17 for running the machine with the electric motor, first, the knob of piece 32 is pressed by hand. The pin 30 is then disengaged from the hook 29 and the spring 31 pushes the crank 27 to the position shown in Fig. 7. The crank is then tilted around the pivot 26 until the position shown in Figure 5 is reached and, finally, the crank is pushed into the flywheel so that the hook 29, pushed downward by the pin 30 in the position shown in Figure 5, rises again under the action of the spring 31 and locks the crank in the position shown in Figure 2.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

Having now particularly described and ascertained the nature of my said invention and in what manner the same is to be performed, I declare that what I claim is:

1. In a sewing machine suitable both for motor and hand drive, provided with a frame, a needle-bar and stitch-forming members the combination comprising a shaft in the upper part of said frame driving said needle-bar, a hand-wheel whose rotational axis is in alignment with the axis of said shaft, the radius of said handwheel being such that its periphery does not project from the upper part of said frame, a crank on said handwheel, means connecting said handwheel with said shaft, a lower shaft actuating said stitch-forming members, transmission means connecting said two shafts, a flywheel mounted on one of the two shafts, an electric motor driving one of the two shafts and means for disconnecting the drive between the motor and the shaft connected thereto.

2. In a sewing machine suitable both for motor and hand drive, provided with a frame, a needle-bar and stitch-forming members the combination comprising a shaft driving the needle-bar, a hand-wheel connected to said shaft through a multiplier gear train, a crank hinged to said handwheel, said handwheel having a recess therein for receiving said crank, a pin whereon the crank is hinged, a piece slidable within the handwheel fixed to said pin, a spring tending to thrust outward said piece and the crank connected thereto, a hook for retaining said piece in retracted position, means for actuating the hook from outside said handwheel, a spring cooperating with said means, a second shaft actuating the stitch-forming members, transmission means connecting said shafts, an electric motor driving one of said shafts and means for disconnecting the drive between the motor and the shaft connected thereto.

3. In a sewing machine suitable both for motor and hand drive, provided with a frame, a needle-bar and stitch-forming members the combination of a shaft placed in the upper part of said frame driving the needle-bar, a hand-wheel whose rotational axis is in alignment with the axis of said shaft, the radius of said hand-wheel being such that its periphery does not project from the upper part of the frame, a crank hinged to said handwheel, means connecting said handwheel with said shaft, said handwheel having a recess therein for receiving said crank, a pin whereon said crank is hinged, a piece slidable within said handwheel fixed to said pin, a spring tending to thrust outward said piece and the crank connected thereto, a hook for retaining said piece in retracted position, means for actuating the hook from outside said handwheel, a spring cooperating with said means, a lower shaft driving the stitch-forming members, transmission means connecting said two shafts, a flywheel mounted on one of the two shafts, an electric motor driving one of the two shafts and means for disconnecting the drive between the motor and the shaft connected thereto.

4. In a sewing machine suitable both for motor and hand drive, provided with a frame, a needle-bar and stitch-forming members the combination of a shaft driving the needle-bar, a handwheel having a crank hinged thereon, a sleeve provided with two radial slots mounted loose and rotatable in said handwheel and coaxial therewith, a gear fixed to said sleeve, a multiplier gear train connecting said gear to said shaft driving the needle-bar, two pieces slidable in said sleeve through said two slots, elastic means cooperating with said pieces, conical means slidable axially in contact with said two pieces, a lower shaft driving the stitch-forming members, transmission means connecting said two shafts, an electric motor driving one of the two shafts and means for disconnecting the drive between the motor and the shaft connected thereto.

5. In a sewing machine suitable for both motor and hand drive, provided with a frame, a needle-bar and stitch-forming members the combination of a shaft placed in the upper part of said frame driving the needle-bar, a handwheel whose rotational axis is in alignment with the axis of said shaft, the radius of said handwheel being such that the periphery thereof does not project from the upper part of the frame, a crank hinged to said handwheel, a sleeve provided with two radial slots mounted loose and rotatable in said handwheel and coaxial therewith, a gear fixed to said sleeve, a multiplier gear train connecting said gear to the shaft driving the needle-bar, two pieces slidable on the sleeve through said two slots, elastic means cooperating with said pieces, conical means slidable axially in contact with said two pieces, a lower shaft driving the stitch-forming members, transmission means connecting said two shafts, a flywheel mounted on one of the two shafts, an electric motor driving one of the two shafts and means for disconnecting the drive between the motor and the shaft connected thereto.

6. In a sewing machine suitable both for motor and hand drive, provided with a frame, a needle-bar and stitch-forming members the combination of a shaft driving the needle-bar, a handwheel, a sleeve provided with two radial slots mounted loose and rotatable in said handwheel and coaxial therewith, a gear fixed to said sleeve, a multiplier gear train connecting said gear to the shaft driving the needle-bar, two pieces slidable in the sleeve through the two slots, elastic means cooperating with said pieces, conical means slidable axially in contact with said two pieces, a crank hinged to said handwheel, said handwheel having a recess for receiving said crank, a pin whereon said crank is hinged, a piece slidable within said handwheel fixed to said pin, a spring tending to thrust outward said piece and the crank connected thereto, a hook for retaining said piece in retracted position, means for actuating the hook from outside the handwheel, a spring cooperating with said means, a lower shaft driving the stitch-forming members, transmission means connecting said two shafts, an electric motor driving one of the two shafts and means for disconnecting the drive between the motor and the shaft connected thereto.

7. In a sewing machine suitable both for motor and hand drive, provided with a frame, a needle-bar and stitch-forming members the combination of a shaft placed in the upper part of said frame driving the needle-bar, a handwheel whose rotational axis is in alignment with the axis of said shaft, the radius of said handwheel being such that the periphery thereof does not project from the upper part of the frame, a sleeve provided with two lateral slots mounted loose and rotatable in said handwheel and coaxial therewith, a gear fixed to said sleeve, a multiplier gear train connecting said gear to the shaft driving the needle-bar, two pieces slidable in the sleeve through the two slots, elastic means cooperating with said pieces, conical means slidable axially in contact with said two pieces, a crank hinged to said handwheel, said handwheel having a recess therein to receive said crank, a pin whereon said crank is hinged, a piece slidable within said handwheel fixed to said pin, a spring tending to thrust outward said piece and the crank connected thereto, a hook for retaining said piece in retracted position, means for actuating the hook from outside said handwheel, a spring cooperating with said means, a lower shaft driving the stitch-forming members, transmission means connecting said two shafts, a flywheel mounted on one of the two shafts, an electric motor driving one of the two shafts and means for disconnecting the drive between the motor and the shaft connected thereto.

8. In a sewing machine the combination of a frame, a first shaft, a second shaft spaced from said first shaft, a first flywheel, means connecting said first flywheel with one of said shafts for rotating said first flywheel, a handle on said first flywheel, the center of gravity of said first flywheel together with said handle being on the rotational axis of said first flywheel, a second flywheel on one of said shafts, means interconnecting said shafts for rotational movement, an electric motor for driving one of said shafts, said first flywheel having a recess for receiving said handle, a pin in said first flywheel perpendicular to the axis of said first flywheel upon which said handle is pivoted and a member slidably supported within said first flywheel in a direction parallel to the axis of said first flywheel to which said pin is connected and a hook for retaining said member in retracted position.

9. In a sewing machine the combination of a frame, a first shaft, a second shaft spaced from said first shaft, a first flywheel, means connecting said first flywheel with one of said shafts for rotating said first flywheel, a handle on said first flywheel, the center of gravity of said first flywheel together with said handle being on the rotational axis of said first flywheel, a second flywheel on one of said shafts, means interconnecting said shafts for rotational movement, an electric motor for driving one of said shafts, said means connecting said first fly wheel and shaft including a sleeve upon which said first flywheel is loosely mounted and a pair of jaws slidable in said sleeve.

10. In a sewing machine the combination as set forth in claim 9 wherein a member is provided accessible from the exterior of said frame controlling said pair of jaws when said machine is set for hand operation.

References Cited in the file of this patent

UNITED STATES PATENTS

| | | |
|---|---|---|
| 217,910 | Steward | July 29, 1879 |
| 239,180 | Marshall | Mar. 22, 1881 |
| 1,024,691 | Molyneux | Apr. 30, 1912 |
| 1,311,114 | Dosch et al. | July 22, 1919 |
| 1,936,412 | Stephenson | Nov. 21, 1933 |
| 2,056,125 | Plumley et al. | Sept. 29, 1936 |

FOREIGN PATENTS

| | | |
|---|---|---|
| 559,587 | Germany | Sept. 21, 1932 |